United States Patent [19]

Lamon

[11] Patent Number: 4,998,369

[45] Date of Patent: Mar. 12, 1991

[54] BRINE SHRIMP EGG HARVESTER

[76] Inventor: Mark S. Lamon, P.O. Box 711, Snowville, Utah 84336

[21] Appl. No.: 394,203

[22] Filed: Aug. 15, 1989

[51] Int. Cl.$^5$ .............................................. A01K 81/04
[52] U.S. Cl. ...................................................... 43/6.5
[58] Field of Search ............................. 43/4, 4.5, 6.5

[56] References Cited

U.S. PATENT DOCUMENTS

| | | | |
|---|---|---|---|
| 3,987,572 | 10/1976 | Bieser | 43/6.5 |
| 4,117,726 | 10/1978 | McGroddy | 43/6.5 |
| 4,205,626 | 6/1980 | Muchmore | 43/6.5 |
| 4,563,830 | 1/1986 | Cain | 43/6.5 |
| 4,663,879 | 5/1987 | Bergeron | 43/6.5 |
| 4,798,020 | 1/1989 | George | 43/6.5 |

Primary Examiner—Kurt Rowan
Attorney, Agent, or Firm—A. Ray Osburn

[57] ABSTRACT

An offshore brine shrimp cyst harvesting device providing for the gravity flow of the cyst rich layer of brine into a collection vessel, followed by pumping therefrom and dewatering by a sluice and pressurized means before deposition into porous cyst storage bags. The collection vessel is characterized by an adjustable knife edge inlet dam or weir, allowing the ingestion of the top layer without mixing or roiling so that the cyst concentration is as high as possible. According to one aspect of the invention, the height of the inlet control edge may be automatically controlled with respect to the surface of the water, as by floats or other water depth sensing devices.

23 Claims, 7 Drawing Sheets

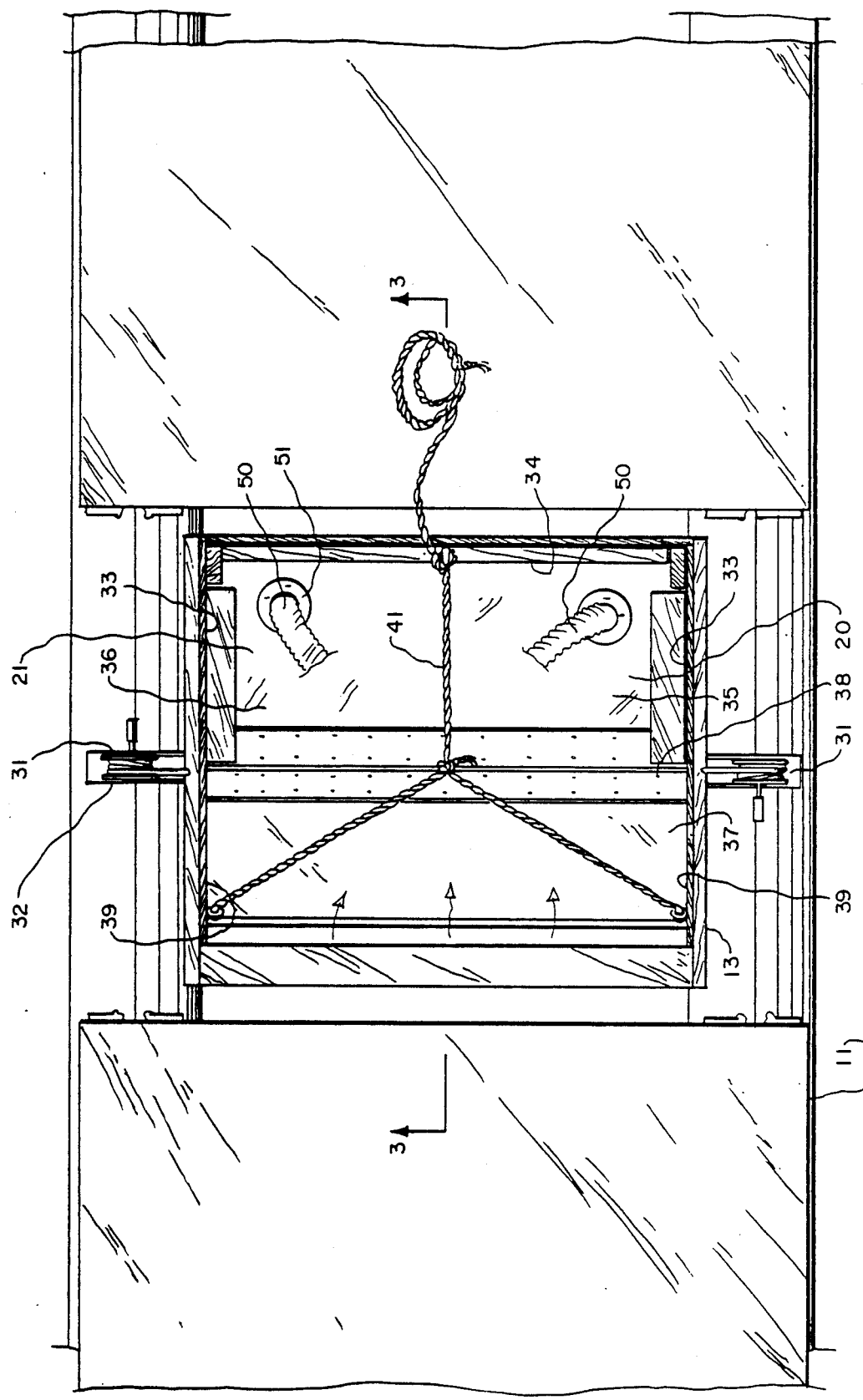

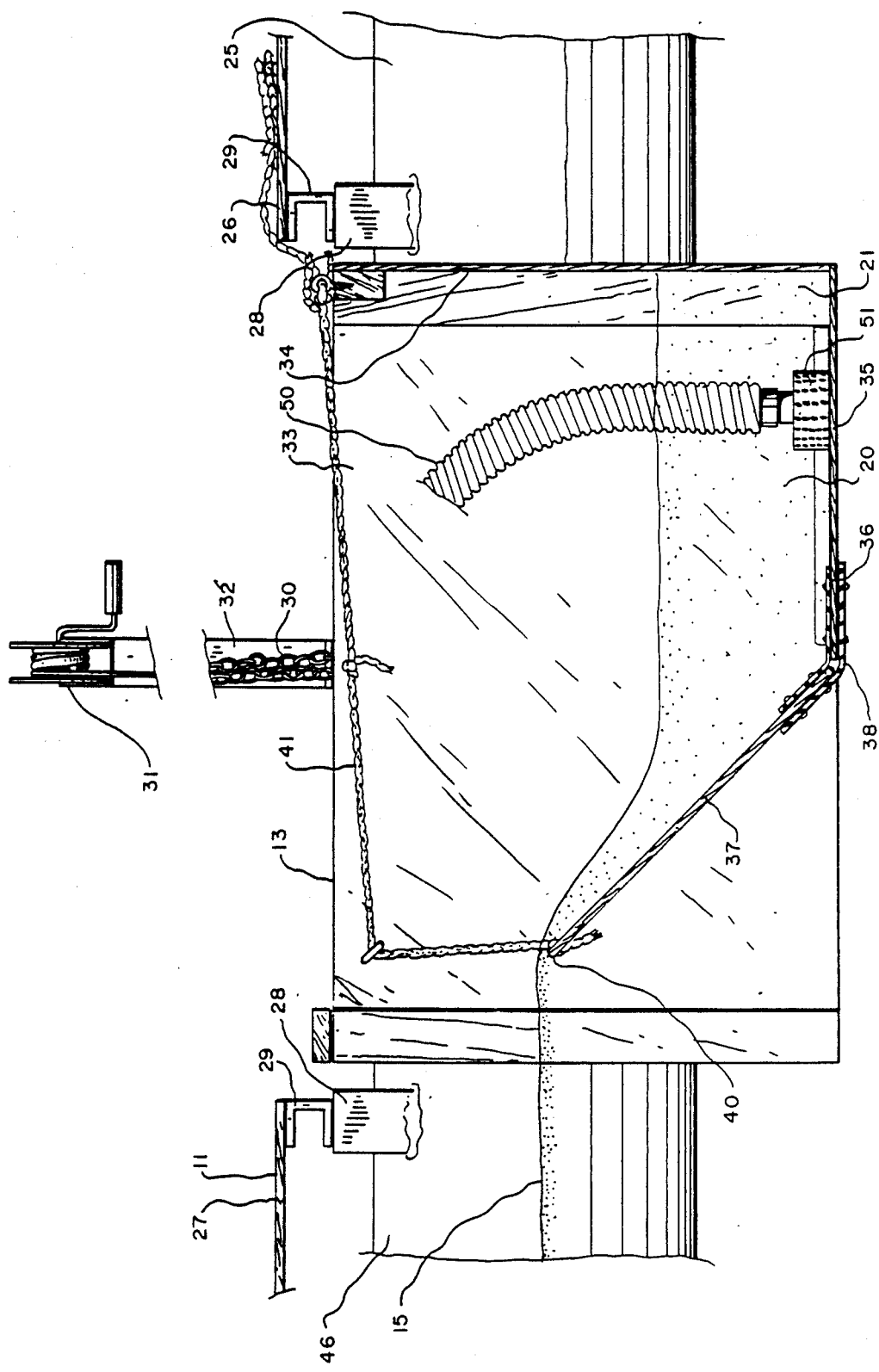

BRINE SHRIMP EGG HARVESTER

BACKGROUND OF THE INVENTION

1. Field

The field of the invention is the harvesting of brine shrimp cysts (eggs) from bodies of highly salt concentrated water such as found in the Great Salt Lake of Utah.

2. State of the Art

Brine shrimp eggs are contained within protective spherical cysts which, in the species of concern, float in dense concentrated brine. The cysts exist in huge numbers and have in fact been harvested from shoreline deposits. However, this method of harvest typically results in the inclusion of much debris and foreign material, including sand and the like. This material must subsequently be removed by washing and other procedures at considerable expense before the cysts are in condition for shipment. Shrimp eggs are ultimately caused to hatch and develop into the shrimp, which are then utilized as food for use in shrimp farms and the like producing food for human consumption. More recently, a great deal of interest has developed in harvesting the shrimp cysts distantly from the shore to avoid the contamination from foreign material. The cysts inhabit the top fraction of an inch of the surface of the salt water. They may be harvested as by manual net dipping, utilizing 120 mesh material and the like. Such harvesting methods are practical, but are undesirably labor intensive. Accordingly, other devices have been conceived based upon pumping the cyst rich top layer of water into porous cloth bags or the like, with the brine subsequently draining away and leaving the cysts within the bags. However, the direct pumping of the surface layer appears to be impractical because the available pumping apparatus ingests far too much water along with the cysts, making the bags straining procedure unduly time consuming and inefficient. Accordingly, devices have been conceived and used which attempt to efficiently concentrate the cysts within the brine before pumping into the final receptacle bags. One such device is disclosed in U.S. Pat. No. 4,839,062, being a raft-supported cyst collection device in a funnel configuration. The funnel is submerged in the water so that a portion of its leading upper edge is below the cyst-containing layer of water. The device then depends upon forward motion of the raft to ingest the cyst-containing layer of water, hopefully concentrated sufficiently to be a slurry. The funnel outlet is connected to a hose and pump system to move the slurry from the funnel into the final cyst collection bags. The success or efficiency of the system depends upon maintenance of the funnel level, which is done by a crank and screw device which adjusts the entire funnel in elevation. This adjustment must be constantly changed because of swells, either occurring from wind or from the forward motion of the raft. The maintenance and adjustment of this level is made even more clumsy and ineffective by the use of wedged shape forwardly extending side bars connected directly to the funnel. The converging side bars must be maintained in proper level also and to do so has required the use of a tower, winch and cable assembly mounted on the raft. This adds to the instability of the raft, compounding the tipping and bobbing which of course results in the submergence and raising of the collection funnel erratically. Further difficulty exists because the center of gravity of the raft structure supporting the collection funnel is constantly changing with the transport of water to the bags and the attendant weight, causing the raft to tilt or yaw. Clearly, a need continues to exist for improving the off-shore harvesting of brine shrimp cysts which effectively avoids or minimizes the intake of excess water and the associated foreign material. It is also highly desirable that efficient dewatering be possible in the off-shore operation to simplify the subsequent final processing.

BRIEF SUMMARY OF THE INVENTION

With the foregoing in mind, the shortcomings and disadvantages in the prior art devices and methods for offshore harvesting of brine shrimp cysts are eliminated or substantially alleviated in the present inventive cyst collection device and method. A cyst collecting vessel is supported as by raft means with its bottom portion submerged well below the surface of the body of cyst containing brine. A portion of the vessel carries a thin horizontal uppermost edge and may be positioned independently to accurrately place the edge slightly below the surface layer of cyst containing brine, which then may enter the vessel over the edge as over the spillway of a dam. The slurry is thus ingested by gravity flow only, with the vessel and the raft maintained as stationary as possible. The use of the thin edge minimizes the roiling of the brine at the vessel inlet, so that the cysts remain at the surface to be more efficiently gathered. Much greater control of ingested excess water is possible than by so-called "skimming" by forward motion of the raft. The device may also include a pair of forwardly diverging independently floating booms, which tend to concentrate the cyst layer at the entrance of the vessel when the raft is moved to succeeding stationary collection locations, and to demobilize wind driven surface layers at the vessel inlet.

The ingested slurry of cysts and salt water is pumped from the bottom of the vessel and ultimately deposited into porous cyst storage and shipment bags. However, the device preferably also includes provisions for further de-brining the slurry before bagging for more rapid filling without the delay necessitated by bag drainage. The slurry is dewatered immediately before it is deposited into the bags, avoiding pumping of overly viscous dewatered slurry with attendant cyst damage. Preferably, the dewatering and bagging apparatus is carried by a separate loosely coupled raft, so that any changes in its attitude from cyst loading and personnel movement does not effect the submerged position of the collecting vessel.

The adjustably positioned portion of the vessel may, according to one aspect of the invention, be supported in desired position by floats, providing automatic adjustment of the edge position to transient changes in water level from wind-induced waves, raft bobbing and the like.

The dewatering devices comprise one or both of a sluice and a pressurized channel device. The open channel sluice comprises a fine mesh, water permeable sieving through which the brine from the slurry drains by gravity. The pressurized device comprises a perforated steel drum or the like lined inside by water permeable sieving. The shrimp/cyst mixture from the sump is pumped through the drum under pressure, causing water to flow outwardly through the porous material.

It is therefore the principal object of the invention to provide apparatus and associated methods for harvesting brine shrimp cysts from bodies of salt water with a minimum of associated brine and foreign materials.

BRIEF DESCRIPTION OF THE DRAWINGS

In the drawings, which represent the best mode presently contemplated for carrying out the invention.

DETAILED DESCRIPTION OF ILLUSTRATED EMBODIMENTS

Figure 1:
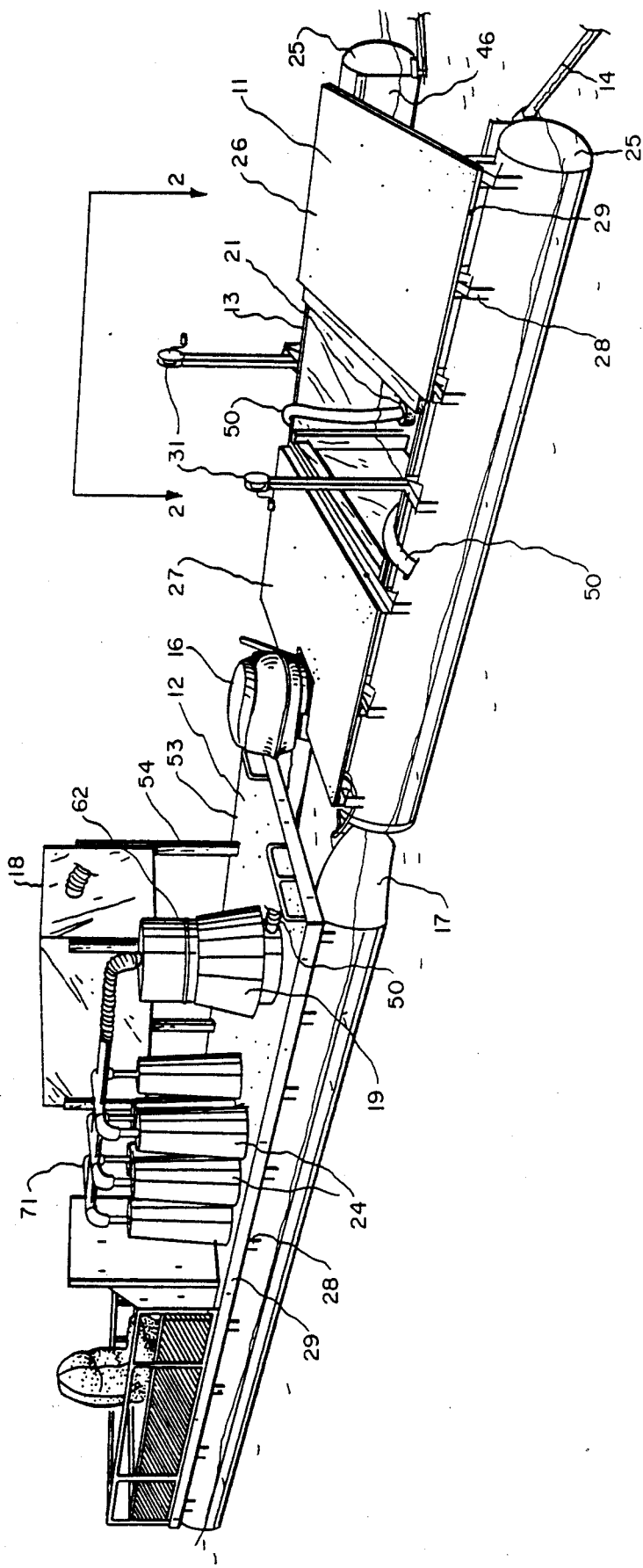
FIG. 1 is a perspective view of an offshore shrimp cyst harvesting device in accordance with the invention, illustrated in conjunction with forward and aft pontoon rafts, drawn to a reduced scale, FIG. 2 a top plan view of a fragment of the device of FIG. 1, showing the cyst collection vessel in use, drawn to a somewhat larger scale than FIG. 1, FIG. 3 a vertical cross sectional view of the fragment of FIG. 2, taken along line 3—3 thereof, drawn to the same scale, FIG. 4 a vertical cross sectional view of a fragment of the forward raft of FIG. 1, showing floating boom attachment details, drawn to the scale of FIG. 2, FIG. 5 a vertical cross sectional view of a portion of the cyst collection vessel of FIG. 3, however embodying float means for control of the cyst inlet edge elevation, drawn to the scale of FIG. 3, FIG. 6 a plan view of a fragment of the vessel of FIG. 5, showing the float means, drawn to the same scale, FIG. 7 a vertical longitudinal section view of the sluice de-brining device of FIG. 1, drawn to the approximate scale of FIG. 3, FIG. 8 a transverse vertical cross sectional view of the sluice de-brining device of FIG. 7, taken along 8—8 thereof, drawn to the same scale, also schematically indicating one of the brine pumps of the harvesting device, and FIG. 9 a side elevation view of a fragment of the pressure de-brining device of FIG. 1, the drum thereof being cut away showing the interior, a portion of the bag loading manifold and one of the cyst receiving storage bags being also shown, drawn to the approximate scale of FIG. 8.

An offshore brine shrimp harvesting device 10 in accordance with the invention is shown in FIG. 1. The various components of cyst harvester 10 are illustrated installed upon a pair of tandemly connected, flat decked, catamaran rafts 11 and 12. Forward raft 11 carries a cyst collection box 13 subsequently described in greater detail, while rearward raft 12 carries dewatering and bagging devices for the collected cysts. A pair of booms 14 float diverging forwardly upon the water surface, damping small surface waves and directing wind driven cyst rich surface layer 15 to the entrance of collecting box 13. Advantageously, each vessel has an outboard motor 16 for independent control during operation and for initial placement and hookup of the rafts. In operation, rafts 11 and 12 are flexibly connected as by straps 17, so as to float essentially independently. Two separate dewatering devices 18 and 19, are carried upon rear raft 12. Cyst containing brine 20 is drawn from a bottom sump 21 of box 13 by one of a pair of pumps 12 to each dewaterer. (FIGS. 2-9) Dewaterer 19 utilizes pump pressure to expel excess water, while sluice dewaterer 18 relies upon gravity drainage. After dewatering, each device directs the cyst concentrated brine into cyst storage bags 23, advantageously installed within perforated conical supports 24. Both dewaterers 18 and 19 are subsequently described in greater detail. It is noted here that carrying the dewaterers and storage bags separately from collection raft 11 contributes to its stability, aiding greatly in minimizing water ingested along with the cysts.

Cyst collection box 13 is adapted for efficient garnering of the egg rich upper surface layer 15 of the water. In calm water, the cysts float essentially upon the water surface, penetrating only under the influence of surface roiling from air currents, waves and the like. Normally, the cysts do not penetrate more than an inch downward into the water, appearing as a brown surface scum to the uninitiated eye. Collection box 13 is adapted for harvesting this upper layer of salt water with maximum cyst and minimum brine content. This facilitates subsequent dewatering and bagging operations.

Forward raft 11 is supported on the water by a pair of pontoons 25, and comprises a forward deck 26 and an aft deck 27 both supported by brackets 28 and framing members 29. Collection box 13 is preferably installed centrally to raft 11 between forward deck 26 and aft deck 27. For initial installation and vertical placment, box 13 is supported by cable and chains 30 operated by a pair of manual winches 31 upon stanchions 32 secured to raft framing 29. In operation, box 13 is bolted in operational vertical position with the sump portion 21 well below surface 15 of the water. Box 13 is formed by vertical side and aft walls 33 and 34 respectively, a fixed aft portion 35 of bottom 36 and a rearward, upwardly sloping plate 37 secured to the bottom by hinge 38. Edges 39 of plate 37 move in close clearing relationship to side walls 33 when said member is rotated about hinge 38. Sump chamber 21 thus remains essentially sealed from unwanted influx of water.

Figure 5:
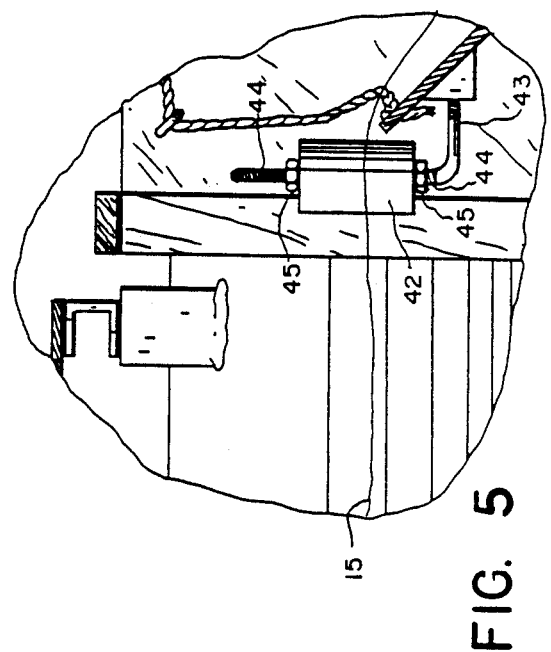
Figure 6:
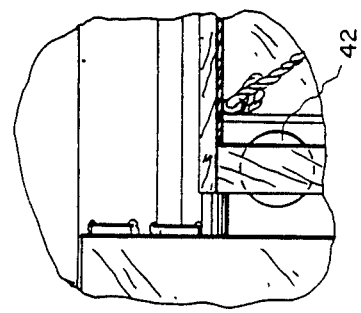
Figure 4:
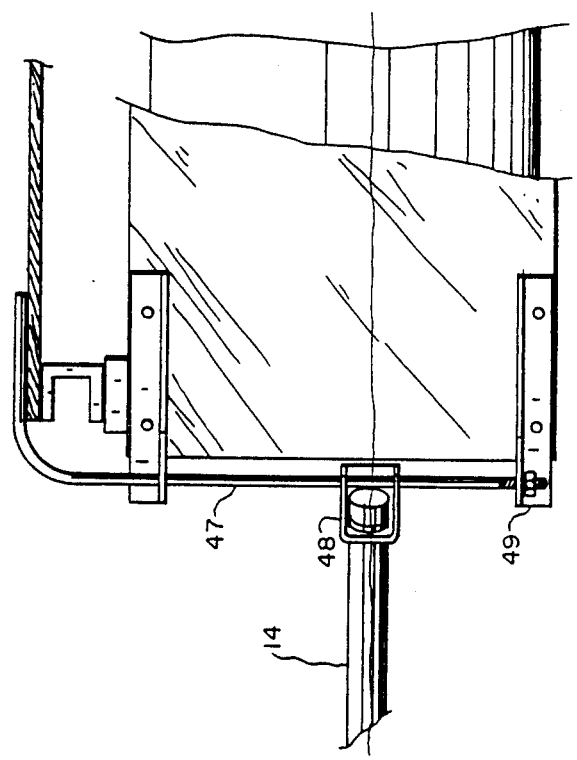
Figure 7:
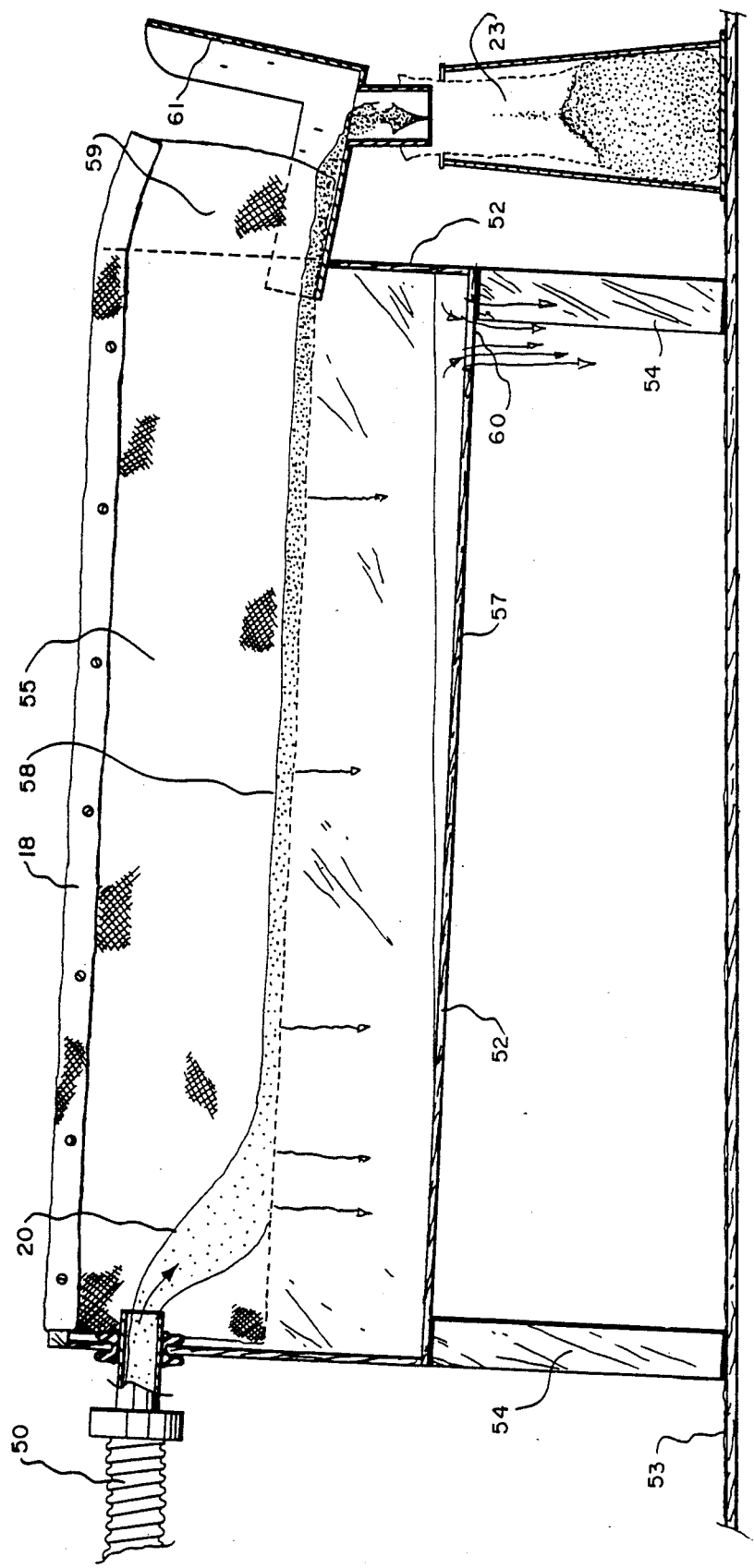
Figure 8:
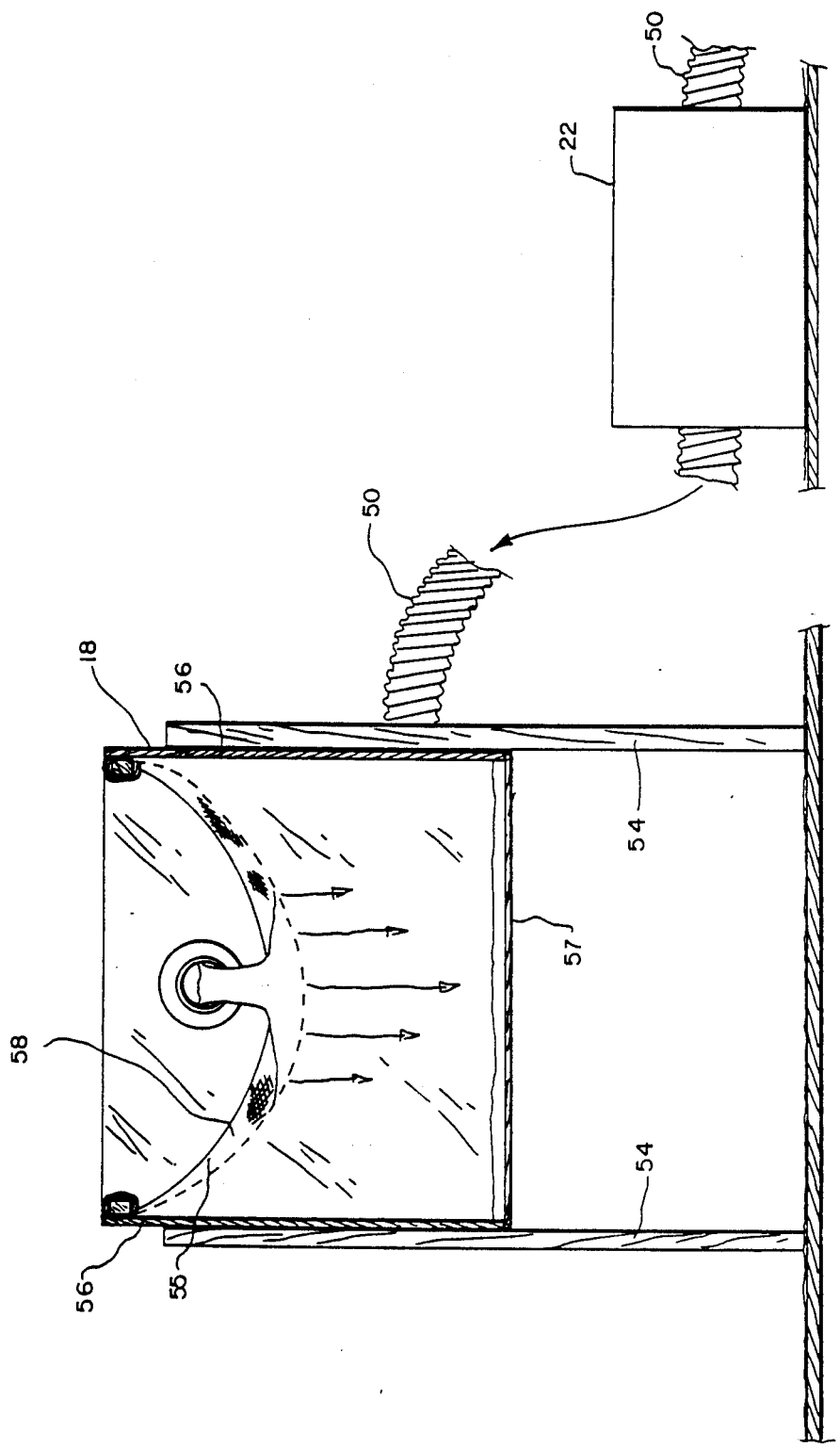
Figure 9:
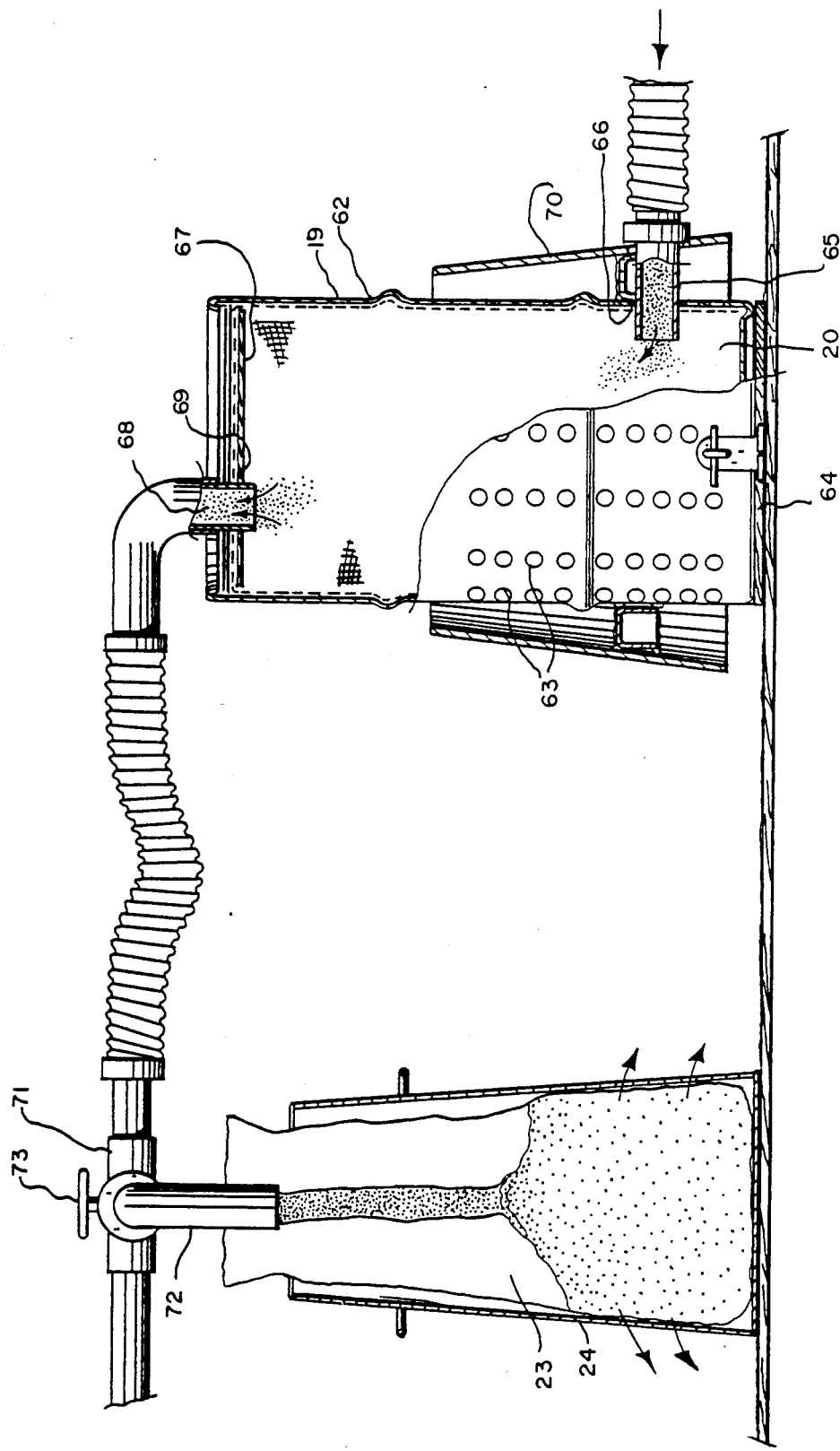

Hinge plate 37 terminates in a thin uppermost horizontal edge 40. During cyst collection, the angle of hinge plate 37 is adjusted by rope 41 until edge 40 is shallowly submerged, with raft 11 preferably floating or anchored to be essentially stationary. Water inlet control edge 40 thus functions essentially as a dam, allowing only the cyst-rich surface layer 15 of brine to flow into sump 21. The position of edge 40 with respect to the water surface can be adjusted very precisely when the raft is stationary. The slurry is ingested by gravity flow only, the thin edge 40 minimizing disturbance of surface layer 15. In contrast, flat edge, moving raft "skimming" procedures roil surface layer 15, dispersing the cysts to greater depths. Cysts evade capture or are captured only with the ingestion of excess water. Floats 42 may be incorporated to provide automatic adjustment for the water level perturbations that occur even with a stationary raft. Rod and brackets 43 secure each float 42 to hinged plate 37. Rod 43 carries threads 44 and nuts 45 for vertical adjustment of each float for proper height of inlet edge 40. (FIGS. 5 & 6)

Extending forwardly from box 13, a pair of vertical sideboards 46 prevent lateral flow of the water in the vicinity of box 13, directing it to inlet edge 40. A pair of freely floating booms 14 pivot about and slide vertically along a pair of boom guides 43 connected by brackets 48 to the sideboards 46 at the forward end of raft 11. Booms 14 are selectively angled upon the water surfaces by boom tethers 49 secured to the sides of forward deck 26 and the distal end of each boom. Booms 14 tend to concentrate the cysts at the collection box when the raft is moved to succeeding stationary collection locations, and to demobilize wind driven surface layers at the collection container inlet.

Pumps 29 and hoses 50 with debris screens 51 move brine/cyst slurry 20 from sump 21 to dewatering devices 18 or 19. The slurry 20 is continuously pumped from sump 29, maintaining its level well below inlet edge 40 and the water surface 15.

Sluice dewaterer 18 comprises an open top slurry receptacle 52 supported above deck 53 of rearward raft 12 by legs 50, and sloping gradually downward in the aft direction. A fine mesh, water permeable, flexible screen 50 is secured to sag between the sides 56 of receptacle 52 above its bottom 57, creating a full length free surface flow channel. Cyst laden brine from sump 21 is discharged from one of the hoses 50 into the higher forward end of channel 50. The slurry then flows slowly toward outlet end 59. Excess brine flows downward through screen 55 into the bottom of receptacle 57, to eventually drain through holes 60 onto deck 53 and thence overboard. At the aft end of sluice 52, screen 55 discharges the cysts and remaining brine through a funnel 61 downward into a water permeable cyst storage bag 23 advantageously contained within a perforated conical support 24. This bag is also preferably water permeable material providing further dewatering or drainage of the cysts after the bag is filled.

Pressurized dewaterer 19 comprises a steel drum 62 with a multiplicity of sidewall perforations 63. Inverted inside drum 62 is one of the water permeable, cyst impermeable bags 23. The open end of bag 23 is clamped sealably against a wooden base 64. Hose 50 from a pump 22 is secured to an inlet bung tube 65 extending through a hole 66 provided near the top of inverted bag 23. An upper circular disc 67 of wood inside bag 23 maintains it in generally open cylindrical shape. An outlet bung tube 68 on the top of drum 62 communicates with the inside of bag 23 through bag bottom hole 69. Pump 22 collects cyst laden brine 20 from sump 21 and passes it through hose 50 to inlet tube 65. Much of the brine is forced under pump pressure rapidly through bag 23 to exit from perforation 63 onto deck 53. A shield 70 may be installed around the perforations 63 to direct the emerging salt water streams downwardly to the deck. From bag 23 in drum 62, the dewatered slurry is forced into a manifold 71 and out through spigots 72 with shutoff valves 73 into collection bags 23.

The invention may be embodied in other specific forms and steps without departing from the spirit or essential characteristics thereof. The present embodiments and method is therefore to be considered in all respects as illustrative and not restrictive, the scope of the invention being indicated by the appended claims rather than by the foregoing description, and all changes which come within the meaning and range of equivalency of the claims are therfore intended to be embraced therein.

What is claimed and desired to be secured by United States Letters Patent is:

1. A device for harvesting brine shrimp cysts from a body of brine having such cysts in a thin layer at its surface, said device comprising:
    a cyst collection vessel having a bottom member and wall member means upstanding therefrom so as to form therewith a sump pit within the bottom of the vessel, wherein a portion of the wall member means has a thin uppermost horizontal edge and is selectively positionable with respect to the remainder of the vessel;
    means supporting the collection vessel in the brine with the sump pit portion submerged; so that
    the positionable wall portion may be positioned selectively independently of the remainder of the vessel with its thin edge slightly below the surface of the brine, so that the cyst containing surface layer of the brine may flow over the thin edge into the sump pit without movement of the supporting means within the brine; and
    pumping means removing the resulting contents of the pit.

2. The harvesting device of claim 1, wherein:
    the positionable wall portion is selectively positioned visually by manual means.

3. The harvesting device of claim 1, further comprising:
    means automatically positioning the selective positionable wall portion in response to variations in the surface of the body of brine.

4. The cyst harvesting device of claim 1, wherein the selectively positionable wall portion further comprises:
    horizontal hinge means securing the wall portion to the vessel;
    sealing means substantially preventing the entry of brine into the vessel about the wall portion; and
    means causing the wall portion to rotate about the hinge to selectively position the thin edge slightly below the surface of the brine.

5. The harvesting device of claim 4, wherein:
    the positionable wall portion is selectively rotated visually by manual means.

6. The harvesting device of claim 4, further comprising:
    means automatically rotating the selective positionable wall portion in response to variations in the surface of the body of brine.

7. The harvesting device of claim 3, wherein:
    the automatic positioning means comprises float means secured to the wall portion.

8. The harvesting device of claim 6, wherein:
    the automatic positioning means comprises float means secured to the wall portion.

9. The harvesting device of claim 1, further comprising:
    at least one brine removal device operable upon the material pumped from the sump pit; and
    at least one container receiving the material from the brine removal device.

10. The harvesting device of claim 2, further comprising:
    at least one brine removal device operable upon the material pumped from the sump pit; and
    at least one container receiving the material from the brine removal device.

11. The harvesting device of claim 5, further comprising:
    at least one brine removal device operable upon the material pumped from the sump pit; and
    at least one container receiving the material from the brine removal device.

12. The harvesting device of claim 3, further comprising:
    at least one brine removal device operable upon the material pumped from the sump pit; and
    at least one container receiving the material from the brine removal device.

13. The harvesting device of claim 6, further comprising:

at least one brine removal device operable upon the material pumped from the sump pit; and at least one container receiving the material from the brine removal device.

14. The harvesting device of claim 13, wherein the brine removal device comprises:

a downwardly sloping sluice channel defined by fine mesh material which is permeable to brine and impermeable to the cysts, so that excess brine is separated by its flow by gravity downwardly through the mesh as material from the sump flows by gravity along the sluice channel.

15. The harvesting device of claim 13, wherein the brine removal device comprises:

fine mesh material which is permeable to brine and impermeable to brine shrimp cysts, said material placed to line a perforated, substantially rigid channel defining member connected to the pumping means removing the pit contents; so that the brine and cysts from the sump pit are caused to flow under pressure through the channel member, forcing excess brine to flow outwardly through the fine mesh lining material.

16. The harvesting device of claim 4, wherein:

the cyst collection vessel and the pumping means are carried by raft means upon the body of brine.

17. The harvesting device of claim 10, wherein:

the cyst collection vessel, the pumping means, the brine removal device and the storage container are carried by raft means on the body of brine.

18. The harvesting device of claim 17, wherein:

the cyst collection vessel is carried by raft means separate from that of the pumping means, the brine removal device and the storage container.

19. The method of harvesting brine shrimp cysts from a body of brine having such cysts in a thin layer at its surface, the method comprising the steps:

providing a cyst collection vessel having a bottom member and wall member means upstanding therefrom forming therewith a sump pit within the bottom of the vessel, wherein a portion of the wall member means has a thin uppermost horizontal edge and is selectively positionable with respect to the remainder of the vessel;

supporting the collection vessel in stationary condition in the brine with the sump pit portion submerged;

positioning the selectively positionable wall portion, independently of the remainder of the vessel so that its thin horizontal edge is slightly below the surface of the brine;

allowing the thin surface layer of the brine above the thin edge to flow thereover into the sump pit; and pumping the resulting contents from the pit.

20. The method of claim 19, comprising the further steps:

removing excess brine from the material pumped from the sump; and depositing the de-brined cysts into storage bags.

21. The method of claim 19, wherein:

the selectively positionable wall portion is positioned visually by manual means.

22. The method of claim 20, wherein:

the selectively positionable wall portion is positioned visually by manual means.

23. The method of claim 19, wherein:

the selectively positionable wall portion is positioned automatically by float means secured to said wall portion.

* * * * *